US010823607B2

(12) United States Patent
Whitaker

(10) Patent No.: US 10,823,607 B2
(45) Date of Patent: Nov. 3, 2020

(54) SYSTEMS AND METHODS FOR CONVERTING, DELAYING, AND MEASURING ELECTROMAGNETIC ENERGY OR WAVE(S) INPUT WITHIN A FIRST FREQUENCY RANGE TO ONE OR MORE FREQUENCIES WITHIN A SECOND FREQUENCY RANGE WITH PREDETERMINED TIME DELAY(S) FOR USE IN APPLICATIONS INCLUDING DATA COLLECTION, IMAGING OR ASTRONOMY

(71) Applicant: The United States of America as represented by the Secretary of the Navy, Crane, IN (US)

(72) Inventor: George W Whitaker, Albuquerque, NM (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/816,062

(22) Filed: Nov. 17, 2017

(65) Prior Publication Data
US 2018/0164153 A1  Jun. 14, 2018

Related U.S. Application Data

(60) Provisional application No. 62/431,783, filed on Dec. 8, 2016.

(51) Int. Cl.
*G01J 1/04* (2006.01)
*G01J 1/42* (2006.01)
*G01J 1/16* (2006.01)

(52) U.S. Cl.
CPC .......... *G01J 1/0407* (2013.01); *G01J 1/1626* (2013.01); *G01J 1/42* (2013.01); *G01J 1/4228* (2013.01)

(58) Field of Classification Search
None
See application file for complete search history.

(56) References Cited

U.S. PATENT DOCUMENTS

| 4,142,775 A * | 3/1979 | Ramaswamy | G02F 1/225 |
| | | | 385/14 |
| 9,472,588 B1 * | 10/2016 | Li | H01L 27/14634 |
| 2007/0023663 A1 * | 2/2007 | Chen | G01J 3/02 |
| | | | 250/339.02 |

* cited by examiner

*Primary Examiner* — Edwin C Gunberg
(74) *Attorney, Agent, or Firm* — Naval Surface Warfare Center, Crane Division; Christopher A. Monsey

(57) ABSTRACT

An electromagnetic (EM) energy conversion and measurement system and related methods are provided for converting a first EM energy (e.g., infrared) to a second EM energy (e.g., visible light) having at least a different wavelength or frequency than the first EM energy then using a detector to detect or measure the second EM energy. An array of conversion and detector assemblies each include a first section and a second section. Exemplary first sections can include at least one optical grade substrate formed with a first material (e.g., germanium) having a first index of refraction that refracts a first EM energy so as to change a frequency and propagation time of the first EM energy to produce a second EM energy. Exemplary second sections include an EM energy detector having an index of refraction that is the same as the first material.

12 Claims, 2 Drawing Sheets

SYSTEMS AND METHODS FOR CONVERTING, DELAYING, AND MEASURING ELECTROMAGNETIC ENERGY OR WAVE(S) INPUT WITHIN A FIRST FREQUENCY RANGE TO ONE OR MORE FREQUENCIES WITHIN A SECOND FREQUENCY RANGE WITH PREDETERMINED TIME DELAY(S) FOR USE IN APPLICATIONS INCLUDING DATA COLLECTION, IMAGING OR ASTRONOMY

CROSS-REFERENCE TO RELATED APPLICATIONS

The present application claims priority to U.S. Provisional Patent Application Ser. No. 62/431,783, filed Dec. 8, 2016, entitled "FREQUENCY CONVERSION," the disclosure of which is expressly incorporated by reference herein.

STATEMENT REGARDING FEDERALLY SPONSORED RESEARCH OR DEVELOPMENT

The invention described herein may be manufactured, used and licensed by or for the United States Government for any governmental purpose without payment of any royalties thereon. This invention (Navy Case 200,394 and 200,396) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

This invention relates to measuring outputs from a conversion system that is based on altering frequency and propagation time, including delay properties, of electromagnetic energy (EM) while in substrates of different materials, for use with a variety of applications including measurement, astronomy, time delay, etc. One example provided herein is for a single substrate of germanium crystal, however this example is provided for understanding the principals involved and are in no way intended to limit the scope of this invention to germanium or a single substrate.

Different embodiments of the invention provide advantages over the prior art. For example, in Astronomy, infrared detectors are used which require cryogenic cooling which are costly and have a variety of other disadvantages such as cost of operation, etc. Embodiments of the invention enable replacement of these costly detectors with a new detector or measurement system that require less complex designs, and reduced energy consumption.

Another area that has disadvantages includes applications requiring detecting of signals of interest for detailed analysis in a propagation time adjusted or delayed stream. In the signal of interest application, a dual detection system can be provided which has a dual detector where some signals are being passed through a frequency conversion/propagation time delay substrate while the same signals bypass the substrate such that the signals passing through the substrate are only analyzed when a signal of interest is detected within the bypass signal stream then the time delayed signals within the substrate are then subjected to higher or more intensive analysis in real time. For example, background noise is being detected until a signal above the background noise is detected, then time delayed signals in the substrate can be analyzed using less resources or computing power given all signals are not being analyzed in real time.

One aspect of the invention is directed towards increasing or decreasing the frequency of EM propagation within the substrate to allow detection, classification or otherwise sensing the EM energy with a sensor or sensor array not usually used for the frequency of the received EM energy.

In particular, an embodiment of the invention can include an EM energy conversion and measurement system adapted for converting a first EM energy to a second EM energy having at least a different wavelength or frequency than the first EM energy and detecting the second EM energy with a detector. This system can include a number or an array of conversion and detector assemblies each including a first, section and a second section. The exemplary system can further include a signal bus that selectively couples with the conversion and detector assemblies. A controller is also provided that is coupled with and controls the signal bus and the conversion and detector assemblies. The exemplary first section can be formed to include at least one optical grade substrate formed with a first material having a first index of refraction that refracts a first EM energy so as to change a frequency and propagation time of the first EM energy passing through the first section and thereby change the first EM energy to a second EM energy. The exemplary second section comprises an EM energy detector formed with a detector portion having the first material and is adapted to output measurement or voltage signals when the second EM energy is detected, the second section is formed to be part of or is bonded to a side of the first section along a propagation path of the second EM energy as it passes into the second section.

Another embodiment of the invention can include a design that splits incoming received EM energy and passes each split beam through substrates with different refraction indexes to obtain multiple frequencies that are received by different detectors tuned to each frequency. In this way differences in frequency, phase and or speed can be analyzed for varying purposes. Generally, another embodiment can have another dual detection system with control systems which enable selective triggering of more detailed or resource intensive analysis of recorded signal measurements.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF EMBODIMENTS OF THE INVENTION

Figure 1:
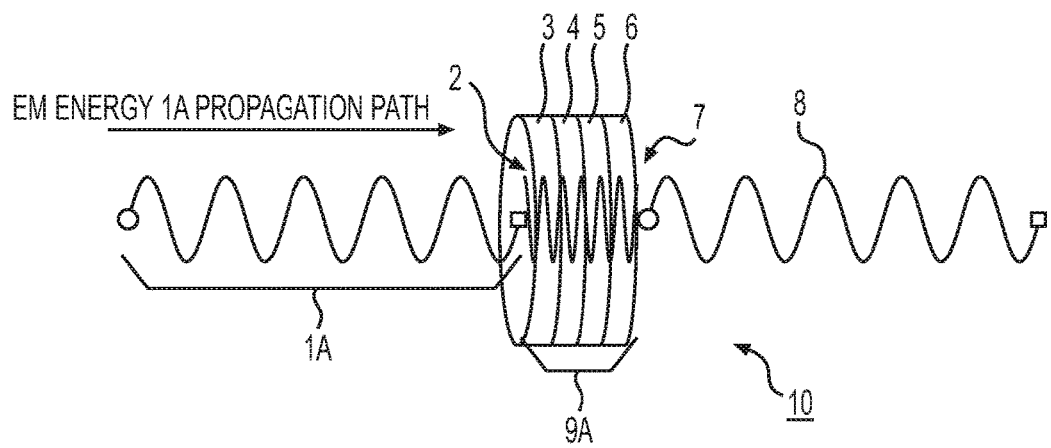
FIG. 1 shows an exemplary diagram of an assembly made up of bonded or fused substrates with differing physical properties such as refraction indexes with one or more sensors that are either embedded into at least one of the substrates or bonded to one substrate.

The embodiments of the invention described herein are not intended to be exhaustive or to limit the invention to precise forms disclosed. Rather, the embodiments selected for description have been chosen to enable one skilled in the art to practice the invention.

When EM energy passes into an optically polished surface of a substrate or material, the speed of the EM energy that propagates through this substrate or material changes proportionally to a refraction index of the substrate or material. If the refraction index is greater than one, then the speed of propagation decreases and the frequency increases. A vacuum is defined with a refraction index of one and normal atmospheric air is very near one. If the EM energy enters normal to the polished face of the substrate or material the angle of propagation does not change. However, if the EM energy enters at an angle off normal there will be a refraction angle proportional to the refraction index and related to the frequency and angle of incidence.

Germanium has a very high refraction index of four and is nearly constant at four over a very wide frequency range including that of infrared (IR) though visible spectrum and into ultraviolet light. This means that the speed of light through germanium drops to nearly ¼ of its speed through air and the frequency increases by a factor four. This idea is not usually evident, because after light passes through the germanium and back into air, it returns to its previous speed and frequency. However, if a detector were embedded inside the germanium crystal or, physical bonded to a back of the optically polished germanium surface, then the detector would be measuring the EM energy while still at four times its received frequency value. A germanium photodiode is a representative embodiment of a bonded detector. The exemplary detector is fabricated directly onto the germanium crystal to preserve the increased frequency of the EM energy. The exemplary photodiode can include positively doped (p-type) and negatively doped (n-type) germanium layers. The exemplary photodiode layer directly contacting the germanium single crystal substrate is slightly larger than the second photodiode layer. Ohmic contacts on the first and second photodiode layers act as electrode contact points for the exemplary detector. Measuring the current across the two electrode contact points enables detection of the EM energy whose frequency is increased by the germanium single crystal. The photodiode can be either forward- or reverse-biased depending on the detector sensitivity requirements. Accordingly, cheap abundant detectors designed for visible light could be used in place of IR detectors that are usually more expensive and require costly cooling.

In at least some embodiments, a simplified representation of an embodiment can include a first and second section where the first section is a frequency and propagation time conversion or delay section and the second section is a visible light detector bonded to or integral with the first section. Material and length of the first section can be determined so that its thickness/material properties combination produces a desired frequency and/or propagation time adjustment which is suitable for a particular application.

For example, in at least some embodiments an application can include converting a first EM energy (e.g., IR energy) into a second EM energy (visible light) using germanium in the first and second section so that a second EM energy detector can be used (e.g., a visible light detector). In this example, a minimum length of the first section along the second EM energy propagation path can be equivalent to one wavelength of a highest frequency of the second EM energy (e.g., visible light) produced by refraction of the first EM energy within the first section. In other words, in this application the second EM energy propagation path can be a path resulting from entry of the first EM energy into the first section and an entry point into the section comprising a germanium doped semi-conductive region of the visible light detector receiving the second EM energy.

Exemplary second section can be a visible light detector having a variety of architectures including, e.g., a complimentary metal oxide semiconductor (CMOS) detector in a detector array comprising a plurality of first and second section assemblies with a random access memory (RAM) bus architecture, a charge coupled device (CCD), etc, that have semiconductor doped regions made with germanium having an identical or substantially identical refraction index as first section germanium bonded to it or which the detector is embedded within if a single crystal is used for the first and second sections. Other embodiments are also, possible based on different applications as well as desire to add additional functionality e.g., lensing.

Referring initially to FIG. 1, a detector assembly 10 notionally representative of one aspect or embodiment of the invention is provided. Optical quality germanium substrates 3,4,5, and 6 have multiple properties such as refraction indexes, thicknesses and optical properties of detector assembly 10. In the FIG. 1 embodiment, the incoming EM energy 1 passes through an optically polished front face 2 of the detector assembly 10. The exemplary substrates 3, 4, 5 and 6 can be made of substances such as optical quality germanium that alter one or more properties of the received EM signal (e.g., IR signal(s)) 1, such as velocity, frequency phase gain, propagation time or delay, etc to convert the incoming EM energy 1 to visible light frequency/frequencies within these substrates (e.g., 3, 4, 5, and/or 6). In this embodiment, substrates 3, 4, and 5 are formed to with shapes and/or material properties to perform lensing functions on the frequency and propagation time converted EM energy 9 within these substrates where these substrates can be, e.g., formed with a convex or concave shapes to perform lensing functions. At least one of the substrates, such as 6, can be or have a visible light frequency imager or light sensor embedded (not shown) in it to measure one or more properties of the frequency and time converted EM energy 9 passing into the imager or light sensor from other substrates (e.g., 3, 4, 5) or that passed through at least one of the substrate assembly layers 10. The visible light imager or sensor (not shown separately from a substrate) can also be bonded to a rear polished face of last substrate 7 along the frequency and propagation time converted EM energy 9 propagation path. EM energy that passes through the assembly 10 may exit through a rear section of last substrate 7 from an optically polished face of the last substrate 7. Substrates, e.g., 3, 4, 5, etc disposed along the frequency and propagation time converted EM energy 9 propagation path will be designed to ensure sufficient visible light can be received by the detector (not shown) that is coupled with the assembly 10 or embedded within one of the substrates (e.g. 6) to ensure detector operation (e.g., avoid losses to intensity of the frequency and propagation time converted EM energy 9 at a specified frequency range).

An exemplary system can have different numbers of layers for lensing or EM signal shaping purposes or for other purposes where different layers or sections of assembly 10 can have different indexes of refraction. However, it must be understood that various embodiments might have a minimum of two sections (e.g., a first section having a frequency conversion and propagation time or delay section and a second section having a sensor section bonded together) that are needed with at least some embodiments having the same material e.g., germanium. In at least one embodiment, an exemplary frequency and propagation time conversion section and detector section can have a same or dose to the same refraction index. Other embodiments can have different index of refraction materials in the frequency conversion and propagation time or delay section to accomplish design purposes (depending on frequency of input EM energy and proposed detector for different applications) other than ones discussed with regard to IR energy. It should also be understood that one or more embodiments can be designed to build an exemplary detector into the frequency and propagation time or time delay structure (or vice versa).

Resonant Frequency=((thickness of the material)*A)/(diameter.sup.2) where A=(the speed of sound in the material) *(a proportionality constant) or $f=(t*A)/d^2$.

Figure 2:
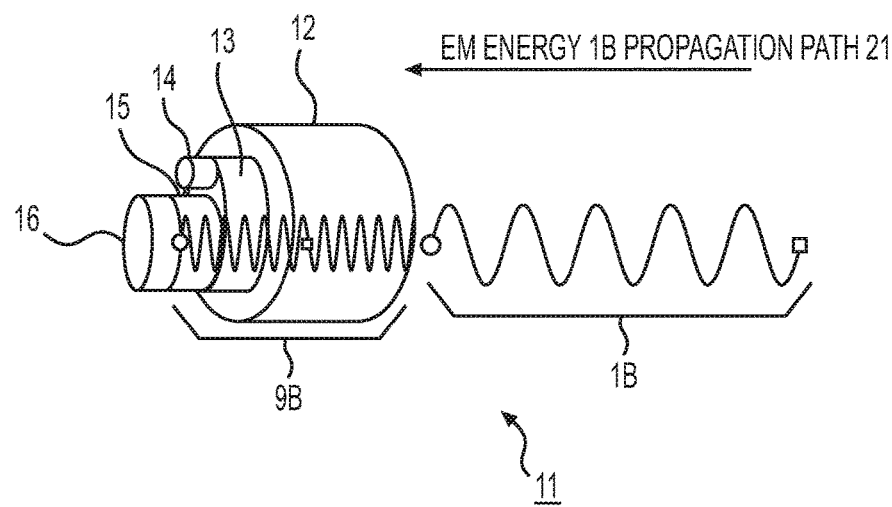
FIG. 2 shows an exemplary diagram of an assembly consisting of a single crystal of germanium having a width equal to at least one wavelength of an EM energy of interest within one or a range of EM energies of interest, optically polished on a front/rear or an entry and an opposing face to the entry face that receives at least the EM energy of interest where a photodiode of n-doped and p-doped germanium acts as a photodiode to detect the EM energy of interest whose frequency is changed by the germanium to visible light within the germanium.

Referring to FIG. 2, a simplified view of an assembly 11 representative of another embodiment of the invention is shown. In at least some embodiments (not shown here), assembly 11 forms one of a plurality of assemblies in an array of assemblies 11 which are coupled by a signal bus (not shown). An exemplary first substrate (e.g., a frequency and propagation time conversion or delay section) 12 can be formed from a single crystal of optical quality germanium, optically polished on opposing front and back faces along a propagation path 21 and increases a frequency of incident EM energy 1B. An exemplary detector assembly (13, 14, 15, 16) can be a photodiode fabricated directly on a back face of the germanium single crystal 12 and can include a n-doped germanium section 16 and p-doped germanium section 15. An exemplary back face mentioned in the previous sentence can be a face opposing an entry face receiving incident EM energy 113 along EM Energy 1B propagation path 21. A conductive layer of germanium doped to be conductive 13 can be formed with a radial dimension perpendicular to propagation path 21 or diameter or foot print that is slightly larger than or extends beyond an edge of doped germanium layer 15 to act as part of the detector photodiode (a signal bus between substrate 15 and 14) as well as a surface for ohmic contact 14 that forms a back contact electrode to convey charge from substrate 15 off the photodiode assembly. Doped (p-doped) germanium layer 15 can be equal in radial dimension or size to n doped substrate 16 so that contact 14 can serve as an ohmic contact that can be used in conjunction with another or ground source contact electrode of the photodiode (not shown but can be coupled with n doped substrate 16). Note that FIG. 2 structures are not to scale or proportional but are represented for ease of viewing (e.g. conductive bus substrate 13 in this embodiment is actually formed as a very thin optical quality germanium layer to transfer electrical charge from photodiode portion 15, 16 to contact 14). Conductive layer 13 can be a portion of a larger conductive layer or set of bus traces providing a bus system for providing a signal bus interface for a number of the assemblies 11 show in FIG. 2. Note an alternative embodiment can have contact 14 placed on a lateral side of p doped substrate 15 relative to EM energy propagation path 21 so as to eliminate conductive layer 13 where an alternative design is desired.

An alternative embodiment can include a design where an exemplary first section can include a substrate doped with impurities such that index of refraction of the first section can be varied by varying voltage, current, magnetic field or other physical properties. Another alternative embodiment can include a design where the first section comprises a substrate patterned into one- two- or three-dimensional structures, such that index of refraction or other physical properties of the first section can be varied the one- two- or three-dimensional structures.

Another embodiment of the invention can include a design that splits incoming received EM energy and passes each split beam through substrates with different refraction indexes to obtain multiple frequencies that are received by different detectors tuned to each frequency. In this way, differences in frequency, phase and or speed can be analyzed for varying purposes.

Figure 3:
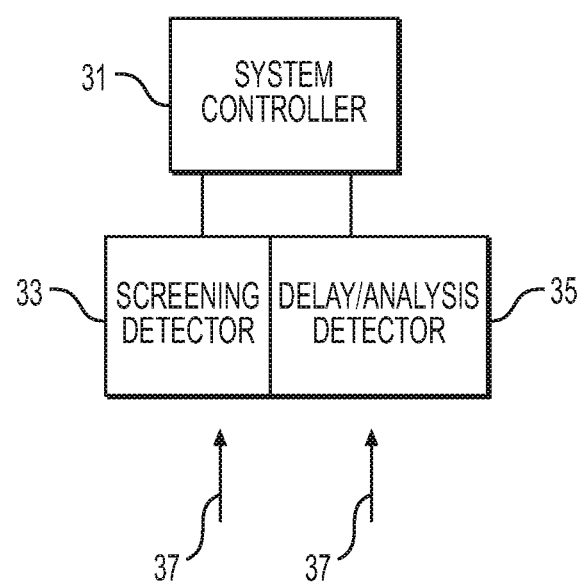
FIG. 3 shows a simplified hardware architecture of a dual path system to enable screening for one or more signals of interest in a first detector path and a selective activation of analysis of detected signals of interest identified in a second detector path.

Referring to FIG. 3, a simplified hardware architecture of a dual path system 33, 35 is provided. This exemplary dual path system enables screening for one or more signals of interest in a first or screening detector path 33 and a selective activation of analysis of detected signals of interest identified in a second or analysis detector path 35 for a common input EM energy 37. The second or analysis detector path system 35 can comprise a detector such as disclosed in FIG. 1 or FIG. 2. A controller 31 is provided which receives inputs from the common input EM energy 37 that enables selective triggering of more detailed or resource intensive analysis of recorded signal measurements from the EM energy 37 based on how the second or analysis detector path delays signals passing through it when a first EM energy in one bandwidth range and propagation time period has been converted to a second EM energy with a different bandwidth range and propagation time period which is different than the first EM energy such as disclosed with regard to various embodiments of the invention such as, e.g., with respect to FIGS. 1 and 2 above.

Although the invention has been described in detail with reference to certain preferred embodiments, variations and modifications exist within the spirit and scope of the invention as described and defined in the following claims.

The invention claimed is:

1. An electromagnetic (EM) energy conversion and measurement system adapted for converting a first EM energy into a second EM energy having at least a different wavelength or frequency than the first EM energy and detecting the second EM energy with a detector comprising:
   a plurality of conversion and detector assemblies each comprising a first section and a second section, the assemblies are formed in an array;
   a signal bus selectively coupling with the plurality of conversion and detector assemblies; and
   a controller coupled with the signal bus and the plurality of conversion and detector assemblies;
   wherein the first section comprises at least one optical grade substrate formed with a first material having a first index of refraction and a predetermined thickness that refracts a first EM energy so as to change a frequency and propagation time of the first EM energy passing through the first section and thereby change approximately all of the first EM energy to a second EM energy;
   wherein the second section comprises an EM energy detector formed with a detector portion having the first material and is adapted to output measurement or voltage signals when the second EM energy is detected, the second section is formed to be part of or is bonded to a side of the first section along a propagation path of the second EM energy as it passes into the second section;

wherein the first EM energy is an infrared (IR) spectrum energy, wherein the second section is adapted to detect the second EM energy, wherein the second EM energy is a visible spectrum EM energy.

2. An EM energy conversion and measurement system as in claim 1, wherein first material comprises optical grade germanium.

3. An EM energy conversion and measurement system as in claim 1, wherein the first section comprises a plurality of lensing sections formed to concentrate, amplify, or focus the second EM energy onto the second section.

4. An EM energy conversion and measurement system as in claim 1, wherein the first and second sections comprise a plurality of bonded or fused substrates, wherein at least some of the plurality of conversion and detector assemblies are oriented with respect to a first EM energy propagation path such that at least some of the first EM energy incident at least some of the plurality of conversion and detector assemblies is normal to or at a predetermined angle from normal to an optically polished entry surface each of the said at least some of the plurality of conversion and detector assemblies.

5. An EM energy conversion and measurement system as in claim 1, wherein the first and second section is formed from single substrate or plurality of substrates with a refraction coefficient greater than one resulting in the second EM energy increasing in frequency while within the first section.

6. An EM conversion and measurement system as in claim 1, wherein the second section is adapted to detect visible light that is at a higher frequency than the first EM energy.

7. An EM energy conversion and measurement system as in claim 1, wherein thickness of the first section is determined based on a portion a desired said second EM energy after it is frequency shifted from the first EM energy where a minimum thickness of the first section is determined based on a wavelength of the second EM energy associated with a desired frequency of the second EM energy.

8. An EM energy conversion and measurement system as in claim 1, wherein at least the first section comprises a substrate doped with impurities such that index of refraction of the first section can be varied by varying voltage, current, magnetic field or other physical properties.

9. An EM energy conversion and measurement system as in claim 1, wherein the first section comprises a substrate patterned into one- two- or three-dimensional structures, such that index of refraction or other physical properties can be varied the one- two- or three dimensional structures.

10. An EM conversion and measurement system as in claim 1, further comprising a second detector adapted to receives the first EM energy and output second detector signals to the controller, wherein the controller receives outputs from the second detector and determines if at least one second detector signal of interest is received based on a library of one or more signals of interest, wherein when said at least one second detector signal of interest is detected then said controller applies one or more processing sections to outputs from the plurality of conversion and detector assemblies receiving the second EM energy.

11. An electromagnetic (EM) energy conversion and measurement system adapted for converting a first EM energy to a second EM energy having at least a different wavelength or frequency than the first EM energy and detecting the second EM energy with a detector comprising:

a plurality of conversion and detector assemblies each comprising a first section and a second section, the assemblies are formed in an array;

a signal bus selectively coupling with the plurality of conversion and detector assemblies; and a controller coupled with the signal bus and the plurality of conversion and detector assemblies;

wherein the first section comprises at least one optical grade substrate formed with a first material having a first index of refraction that refracts a first EM energy so as to change a frequency and propagation time of the first EM energy passing through the first section and thereby change the first EM energy to a second EM energy;

wherein the second section comprises an EM energy detector formed with a detector portion having the first material and is adapted to output measurement or voltage signals when the second EM energy is detected, the second section is formed to be part of or is bonded to a side of the first section along a propagation path of the second EM energy as it passes into the second section;

wherein the first EM energy is an infrared (IR) spectrum energy, wherein the second section is adapted to detect the second EM energy which has been frequency shifted to a visible spectrum EM energy frequency;

wherein first material comprises optical grade germanium;

wherein the first section comprises a plurality of lensing sections formed to concentrate, amplify, or focus the second EM energy onto the second section;

wherein the first and second sections comprise a plurality of bonded or fused substrates, wherein at least some of the plurality of conversion and detector assemblies are oriented with respect to a first EM energy propagation path such that at least some of the first EM energy incident at least some of the plurality of conversion and detector assemblies is normal to or at a predetermined angle from normal to an optically polished entry surface each of the said at least some of the plurality of conversion and detector assemblies;

wherein the first and second section is formed from single substrate or plurality of substrates with a refraction coefficient greater than one resulting in the second EM energy increasing in frequency while within the first section;

wherein the second section is adapted to detect visible light that is at a higher frequency than the first EM energy;

wherein thickness of the first section is determined based on a portion a desired said second EM energy after it is frequency shifted from the first EM energy where a minimum thickness of the first section is determined based on a wavelength of the second EM energy associated with a desired frequency of the second EM energy;

wherein at least the first section comprises a substrate doped with impurities such that index of refraction of the first section can be varied by varying voltage, current, magnetic field or other physical properties;

wherein the first section comprises a substrate patterned into one- two- or three dimensional structures, such that index of refraction or other physical properties can be varied the one- two- or three-dimensional structures.

12. An electromagnetic (EM) energy conversion and measurement system adapted for converting a first EM energy to a second EM energy having at least a different wavelength or frequency than the first EM energy and detecting the second EM energy with a detector comprising:
- a plurality of conversion and detector assemblies each comprising a first section and a second section, the assemblies are formed in an array;
- a signal bus selectively coupling with the plurality of conversion and detector assemblies; and a controller coupled with the signal bus and the plurality of conversion and detector assemblies;
- wherein the EM energy and conversion system further comprises a second detector adapted to receives the first EM energy and output second detector signals to the controller, wherein the controller receives outputs from the second detector and determines if at least one second detector signal of interest is received based on a library of one or more signals of interest, wherein when said at least one second detector signal of interest is detected then said controller applies one or more processing sections to outputs from the plurality of conversion and detector assemblies receiving the second EM energy;
- wherein the first section comprises at least one optical grade substrate formed with a first material having a first index of refraction that refracts a first EM energy so as to change a frequency and propagation time of the first EM energy passing through the first section and thereby change the first EM energy to a second EM energy;
- wherein the second section comprises an EM energy detector formed with a detector portion having the first material and is adapted to output measurement or voltage signals when the second EM energy is detected, the second section is formed to be part of or is bonded to a side of the first section along a propagation path of the second EM energy as it passes into the second section;
- wherein the first EM energy is an infrared (IR) spectrum energy, wherein the second section is adapted to detect the second EM energy which has been frequency shifted to a visible spectrum EM energy frequency;
- wherein first material comprises optical grade germanium;
- wherein the first section comprises a plurality of lensing sections formed to concentrate, amplify, or focus the second EM energy onto the second section;
- wherein the first and second sections comprise a plurality of bonded or fused substrates, wherein at least some of the plurality of conversion and detector assemblies are oriented with respect to a first EM energy propagation path such that at least some of the first EM energy incident at least some of the plurality of conversion and detector assemblies is normal to or at a predetermined angle from normal to an optically polished entry surface each of the said at least some of the plurality of conversion and detector assemblies;
- wherein the first and second section is formed from single substrate or plurality of substrates with a refraction coefficient greater than one resulting in the second EM energy increasing in frequency while within the first section;
- wherein the second section is adapted to detect visible light that is at a higher frequency than the first EM energy;
- wherein thickness of the first section is determined based on a portion a desired said second EM energy after it is frequency shifted from the first EM energy where a minimum thickness of the first section is determined based on a wavelength of the second EM energy associated with a desired frequency of the second EM energy;
- wherein at least the first section comprises a substrate doped with impurities such that index of refraction of the first section can be varied by varying voltage, current, magnetic field or other physical properties;
- wherein the first section comprises a substrate patterned into one- two- or three dimensional structures, such that index of refraction or other physical properties can be varied the one- two- or three-dimensional structures.

* * * * *